United States Patent
Yu et al.

(10) Patent No.: US 12,511,341 B2
(45) Date of Patent: Dec. 30, 2025

(54) METHOD OF IDENTIFYING WEBPAGE, ELECTRONIC DEVICE, AND MEDIUM

(71) Applicant: Beijing Baidu Netcom Science Technology Co., Ltd., Beijing (CN)

(72) Inventors: Wenli Yu, Beijing (CN); Wei Liu, Beijing (CN); Bo Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 232 days.

(21) Appl. No.: 18/246,000

(22) PCT Filed: Aug. 2, 2022

(86) PCT No.: PCT/CN2022/109630
§ 371 (c)(1),
(2) Date: Mar. 20, 2023

(87) PCT Pub. No.: WO2023/142417
PCT Pub. Date: Aug. 3, 2023

(65) Prior Publication Data
US 2025/0077609 A1    Mar. 6, 2025

(30) Foreign Application Priority Data
Jan. 29, 2022 (CN) .......................... 202210113248.3

(51) Int. Cl.
*G06F 16/958* (2019.01)
(52) U.S. Cl.
CPC .................................. *G06F 16/958* (2019.01)
(58) Field of Classification Search
CPC .................................................... G06F 16/958
See application file for complete search history.

(56) References Cited

U.S. PATENT DOCUMENTS

| 10,462,168 B2 | 10/2019 | Shibahara et al. |
| 10,740,793 B1 * | 8/2020 | Sussman ............ G06Q 30/0255 |

(Continued)

FOREIGN PATENT DOCUMENTS

| CN | 101694668 | 4/2010 |
| CN | 102316081 | 1/2012 |

(Continued)

OTHER PUBLICATIONS

Wang et al., "Knowledge Graph Inference Algorithm Based on Att_GCN Model", Computer Engineering and Applications, vol. 56, No. 9, 2020, 7 pages.

(Continued)

*Primary Examiner* — Keith D Bloomquist
(74) *Attorney, Agent, or Firm* — HSML P.C.

(57) ABSTRACT

A method of identifying a webpage, a device, and a medium are provided, which relate to a field of an artificial intelligence technology, in particular to fields of deep learning, knowledge graph and other technologies. The method of identifying the webpage includes: acquiring structural data of a target webpage, a first association relationship between the target webpage and a historical webpage, and historical graph data for the historical webpage; determining target graph data for the target webpage and the historical webpage based on the structural data of the target webpage, the first association relationship and the historical graph data; determining a similarity between the target webpage and the historical webpage based on the target graph data; and determining a category of the target webpage based on a category of the historical webpage and the similarity.

14 Claims, 5 Drawing Sheets

(56) References Cited

U.S. PATENT DOCUMENTS

| | | | |
|---|---|---|---|
| 11,212,297 B2 | 12/2021 | Shibahara et al. | |
| 2008/0275902 A1* | 11/2008 | Burges | G06F 16/958 |
| | | | 707/999.102 |
| 2010/0095375 A1 | 4/2010 | Krishnamurthy et al. | |
| 2010/0121790 A1* | 5/2010 | Klinkott | G06F 16/954 |
| | | | 707/E17.046 |
| 2017/0286544 A1* | 10/2017 | Hunt | H04L 63/123 |
| 2018/0176242 A1 | 6/2018 | Shibahara et al. | |
| 2019/0297092 A1 | 9/2019 | Shibahara et al. | |
| 2019/0354689 A1* | 11/2019 | Li | G06N 3/045 |
| 2020/0380051 A1 | 12/2020 | Sadahiro et al. | |
| 2021/0287102 A1 | 9/2021 | Fadnis et al. | |
| 2024/0220772 A1 | 7/2024 | Yu et al. | |

FOREIGN PATENT DOCUMENTS

| | | |
|---|---|---|
| CN | 104133870 | 11/2014 |
| CN | 107341162 | 11/2017 |
| CN | 108306878 | 7/2018 |
| CN | 108874802 A | 11/2018 |
| CN | 110188168 | 8/2019 |
| CN | 110765235 | 2/2020 |
| CN | 111538869 A | 8/2020 |
| CN | 112131506 | 12/2020 |
| CN | 112329964 | 2/2021 |
| CN | 113569059 | 10/2021 |
| CN | 113609493 A | 11/2021 |
| CN | 113806660 | 12/2021 |
| CN | 114492370 A | 5/2022 |
| WO | 2016/194909 | 12/2016 |
| WO | 2017/217163 | 12/2017 |

OTHER PUBLICATIONS

Ye et al., "A Web Services Classification Method based on GCN", IEEE Intl Conf on Parallel & Distributed Processing with Applications, Big Data & Cloud Computing, Sustainable Computing & Communications, Social Computing & Networking, 2019, 8 pages.

Chinese Office Action, issued in the corresponding Chinese Application No. 202210113248.3, dated May 10, 2023, 6 pages.

Japanese Office Action, issued in the corresponding Japanese Patent Application No. 2023-518230, dated May 21, 2024, 7 pages with machine translation.

Extended European Search Report, issued in the corresponding European Patent Application No. 22868408.0, dated May 24, 2024, 9 pages.

* cited by examiner

METHOD OF IDENTIFYING WEBPAGE, ELECTRONIC DEVICE, AND MEDIUM

CROSS-REFERENCE TO RELATED APPLICATION(S)

This application corresponds to PCT Application No. PCT/CN2022/109630, which claims priority to Chinese Patent Application No. 202210113248.3 filed on Jan. 29, 2022, which is incorporated herein by reference in its entirety.

TECHNICAL FIELD

The present disclosure relates to a field of an artificial intelligence technology, in particular to fields of deep learning, knowledge graph and other technologies. More specifically, the present disclosure relates to a method of identifying a webpage, an electronic device, and a medium.

BACKGROUND

In a field of the Internet, a large number of webpages are generated every day for users to search. In order to quickly build websites to attract traffic, some webpage creators may generate webpages through various cheating methods, such as plagiarizing other webpages. Plagiarism does not respect webpage creators or users, which has brought adverse effects to the industry.

SUMMARY

The present disclosure provides a method of identifying a webpage, an electronic device, and a storage medium.

According to an aspect of the present disclosure, a method of identifying a webpage is provided, including: acquiring structural data of a target webpage, a first association relationship between the target webpage and a historical webpage, and historical graph data for the historical webpage; determining target graph data for the target webpage and the historical webpage based on the structural data of the target webpage, the first association relationship and the historical graph data; determining a similarity between the target webpage and the historical webpage based on the target graph data; and determining a category of the target webpage based on a category of the historical webpage and the similarity.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of identifying the webpage as described above.

According to another aspect of the present disclosure, a non-transitory computer-readable storage medium having computer instructions therein is provided, and the computer instructions are configured to cause a computer to implement the method of identifying the webpage as described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Terms used herein are merely for the purpose of describing specific embodiments and are not intended to limit the present disclosure. The terms "including", "containing", etc. used herein indicate the presence of the feature, step, operation and/or component, but do not exclude the presence or addition of one or more other features, steps, operations or components.

All terms (including technical and scientific terms) used herein have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B and C", it should be explained according to the meaning of the expression generally understood by those skilled in the art (for example, "a system including at least one of A, B and C" should include but not be limited to a system including A alone, a system including B alone, a system including C alone, a system including A and B, a system including A and C, a system including B and C, and/or a system including A, B and C).

Figure 1:
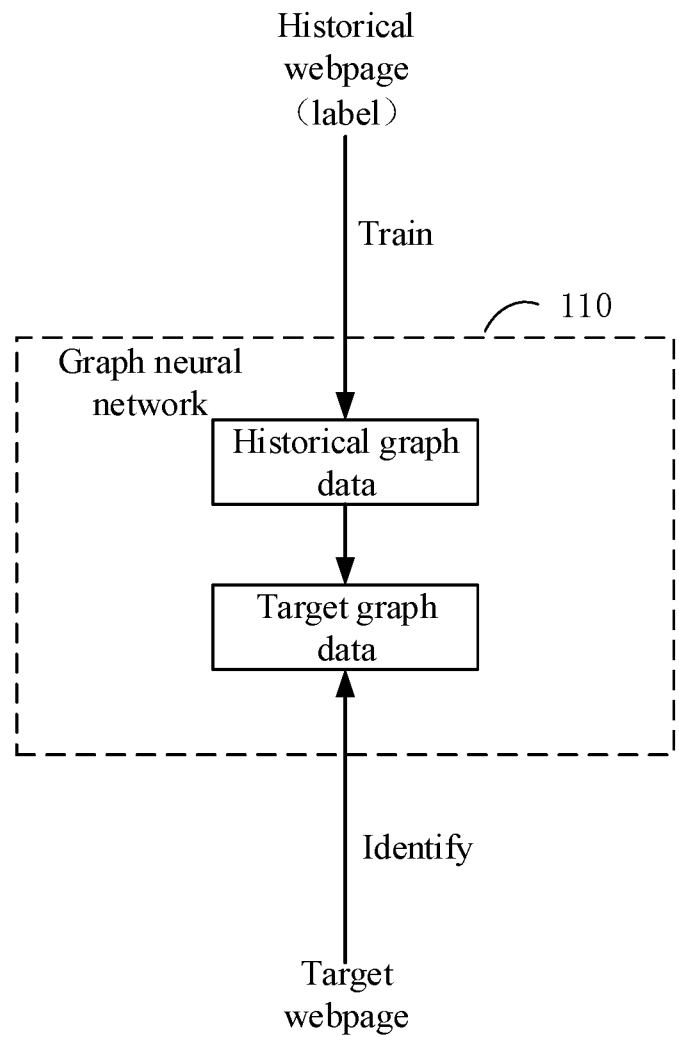
FIG. 1 schematically shows an application scenario of identifying a webpage according to an embodiment of the present disclosure.

FIG. 1 schematically shows an application scenario of identifying a webpage according to an embodiment of the present disclosure. It should be noted that FIG. 1 is merely an example of an application scenario to which embodiments of the present disclosure may be applied, so as to help those skilled in the art understand technical contents of the present disclosure. However, it does not mean that embodiments of the present disclosure may not be applied to other devices, systems, environments or scenarios.

As shown in FIG. 1, an application scenario 100 according to embodiments of the present disclosure may include, for example, a graph neural network (GNN) 110. The graph neural network may be trained based on graph data. The graph neural network may include, for example, a graph convolutional network (GCN).

A historical webpage may contain a label, which indicates a category of the historical webpage, such as a category of plagiarism or a category of non-plagiarism. The category of plagiarism represents that the historical webpage is similar to other webpages, that is, the historical webpage is plagiarism. A plurality of historical webpages may be input into the graph neural network 110, and the graph neural network 110 may construct historical graph data based on the historical webpages. The historical graph data is a knowledge graph. The graph neural network 110 may learn the category of the historical webpage based on the historical graph data, a loss value may be determined based on the learned category and the label of the historical webpage, and a model parameter of the graph neural network 110 may be adjusted based on the loss value, so that the graph neural network 110 may be trained.

After the graph neural network 110 is trained, the graph neural network 110 may be used to identify a category of a target webpage that, for example, has no label. For example, the target webpage may be input into the graph neural network 110. The graph neural network may construct target graph data based on the target webpage and the historical graph data, and learn the target graph data to obtain the category of the target webpage. The category of the target webpage includes a category of plagiarism or a category of non-plagiarism.

A method of identifying a webpage according to embodiments of the present disclosure will be described below in combination with FIG. 2 to FIG. 4 with reference to the application scenario in FIG. 1.

Figure 2:
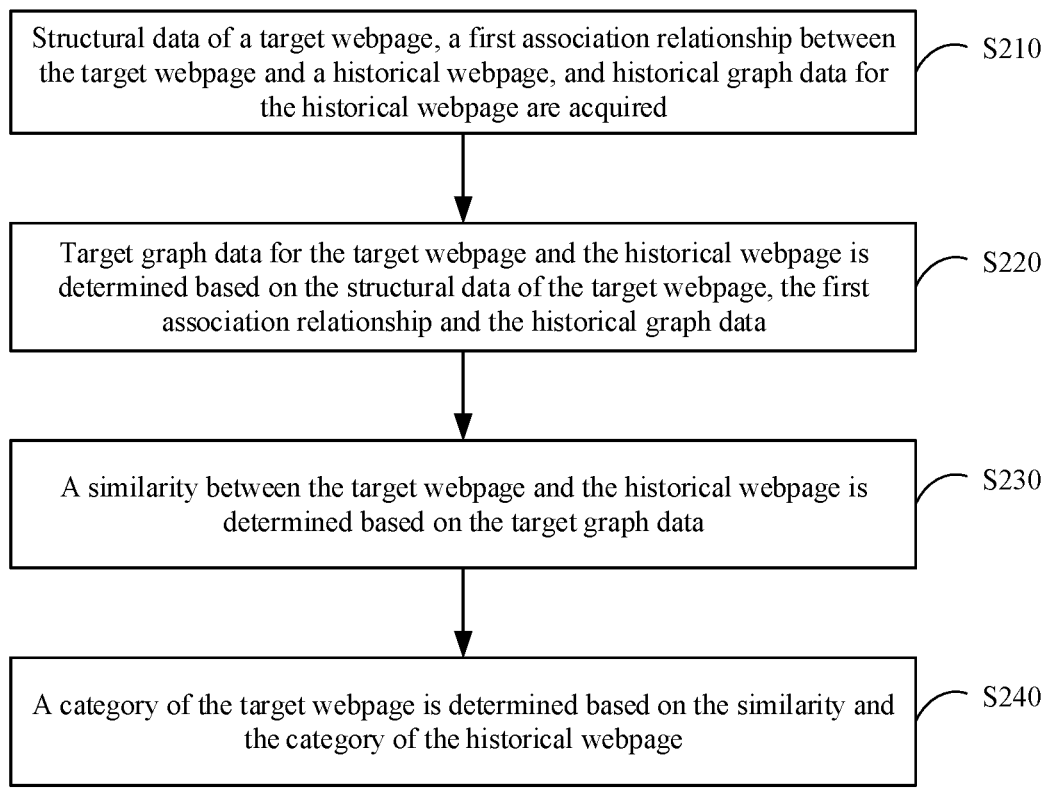
FIG. 2 schematically shows a flowchart of a method of identifying a webpage according to an embodiment of the present disclosure.

FIG. 2 schematically shows a flowchart of a method of identifying a webpage according to an embodiment of the present disclosure.

As shown in FIG. 2, a method 200 of identifying a webpage in embodiments of the present disclosure may include, for example, operation S210 to operation S240.

In operation S210, structural data of a target webpage, a first association relationship between the target webpage and a historical webpage, and historical graph data for the historical webpage are acquired.

In operation S220, target graph data for the target webpage and the historical webpage is determined based on the structural data of the target webpage, the first association relationship and the historical graph data.

In operation S230, a similarity between the target webpage and the historical webpage is determined based on the target graph data.

In operation S240, a category of the target webpage is determined based on a category of the historical webpage and the similarity.

Exemplarily, the structural data of the webpage may include, for example, a title, a body, a style, etc. of the webpage, which are used to represent a composition framework of the webpage. The first association relationship between the target webpage and the historical webpage may represent, for example, whether the target webpage may jump to the historical webpage, or whether the historical webpage may jump to the target webpage.

The historical graph data is obtained based on structural data of a plurality of historical webpages and a second association relationship between the plurality of historical webpages. The second association relationship is similar to the first association relationship.

Exemplarily, the target graph data may be constructed based on the structural data of the target webpage, the first association relationship and the historical graph data. The target graph data indicates, for example, the structural data of the target webpage, the structural data of the historical webpage, and an association between the target webpage and the historical webpage.

Then, the similarity between the target webpage and the historical webpage may be determined from the target graph data. Since the historical webpage has a label indicating the category of the historical webpage, the category of the target webpage may be determined based on the similarity and the category (label) of the historical webpage. For example, if the category of a historical webpage is the category of plagiarism, and the target webpage has a high similarity to the historical webpage, it may be identified that the category of the target webpage is the category of plagiarism with a high probability.

According to embodiments of the present disclosure, graph data is constructed based on structural data of webpages and an association relationship between the webpages, a similarity between the webpages is determined based on the graph data, and a category of a webpage without label is determined based on the similarity and a category of a webpage with a label, so that an accuracy of identifying the category of the webpage may be improved.

Figure 3:
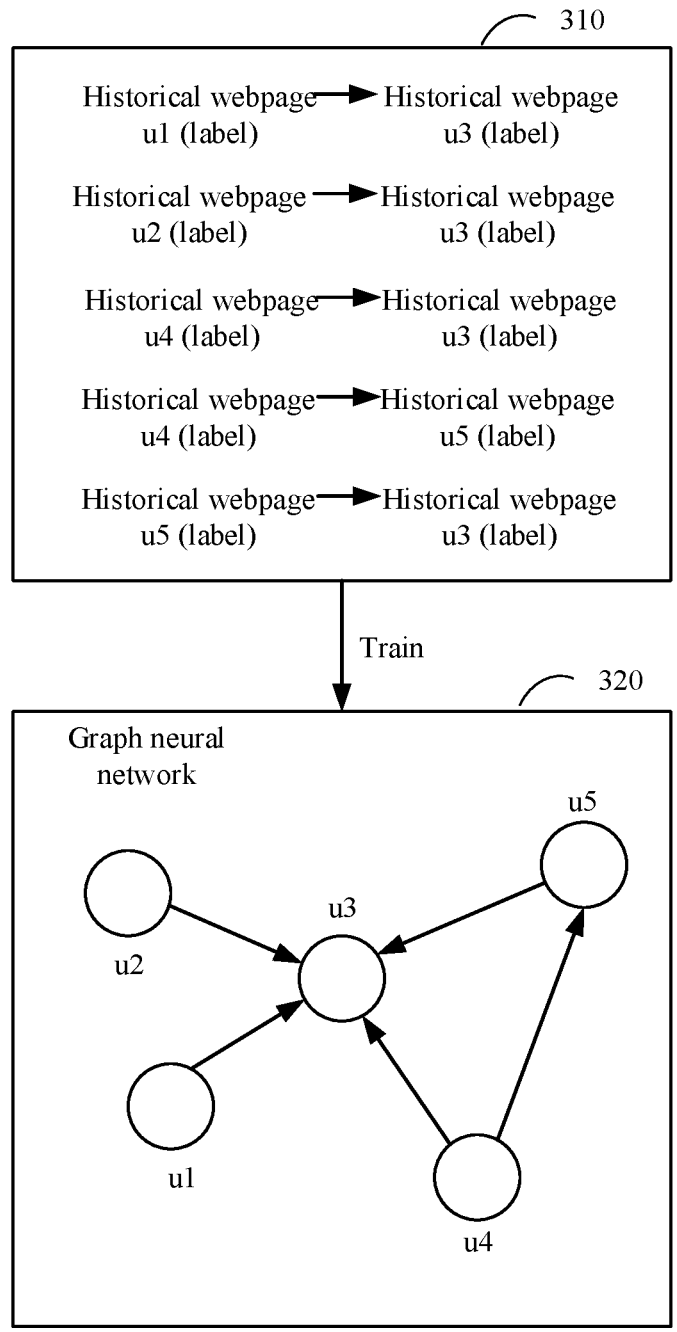
FIG. 3 schematically shows a schematic diagram of training a graph neural network according to an embodiment of the present disclosure.

FIG. 3 schematically shows a schematic diagram of training a graph neural network according to an embodiment of the present disclosure.

As shown in FIG. 3, relevant data 310 of a plurality of historical webpages are input into a graph neural network 320 for model training. The relevant data 310 may include, for example, structural data of each historical webpage and a second association relationship between the plurality of historical webpages. An arrow in the relevant data 310 represents that two historical webpages have a second association relationship.

Exemplarily, a webpage is represented by a webpage link, and the webpage links of the plurality of historical webpages are u1, u2, u3, u4 and u5 respectively. Each historical webpage has a label, which represents the category of the historical webpage is a category of plagiarism or a category of non-plagiarism.

Regarding the second association relationship between the plurality of historical webpages, the second association relationship may represent, for example, a jump relationship between historical webpages. Taking the plurality of historical webpages including a first historical webpage and a second historical webpage as an example, the second association relationship represents that the first historical webpage jumps to the second historical webpage within a second predetermined time period, or that the second historical webpage jumps to the first historical webpage within the second predetermined time period.

For example, the first historical webpage is u1, the second historical webpage is u3, u1 may jump to u3 within the second predetermined time period, or u3 may jump to u2 within the second predetermined time period. u1 jumping to u3 may mean, for example, that a page corresponding to the first historical webpage u1 contains a link information to the second historical webpage u3, and the first historical webpage u1 may jump to the second historical webpage u3 via the link information. The second predetermined time period is, for example, a recent period of time.

Alternatively, for the first historical webpage u1, if a plurality of historical webpages may jump to u1, a predetermined number of historical webpages recently jumping to u1 may be determined as the second historical webpages having the second association relationship with u1.

After the relevant data 310 is input into the graph neural network 320, the graph neural network 320 may construct historical graph data based on the structural data of the historical webpages and the second association relationship. The historical graph data may have, for example, node elements and edge elements. Each node element corresponds to a historical webpage, and the structural data of the historical webpage is associated with the node element. An edge element corresponds to the second association relationship between two historical webpages. Taking historical webpages u1 and u3 as examples, each of u1 and u3 corresponds to a node element, and the edge element between the node element for u1 and the node element for u3 represents that u1 and u3 have the second association relationship.

After the historical graph data is obtained, the graph neural network may identify the historical graph data to obtain the categories of the historical webpages. When identifying the historical graph data, the graph neural network may fully learn an intrinsic information between the structural data of the historical webpages based on the second association relationship. Since each historical webpage contains a label indicating the category, the graph neural network may determine a loss value based on a reference category (label) and the identified category of the historical webpage, and update a network parameter of the graph neural network in a backward manner based on the loss value, so that a trained graph neural network is obtained.

According to embodiments of the present disclosure, for the historical webpages with labels, the structural data of the historical webpages and the second association relationship between the historical webpages are extracted, and the graph neural network is trained based on the structural data and the second association relationship, so that the graph neural network may identify the webpage more accurately.

Figure 4:
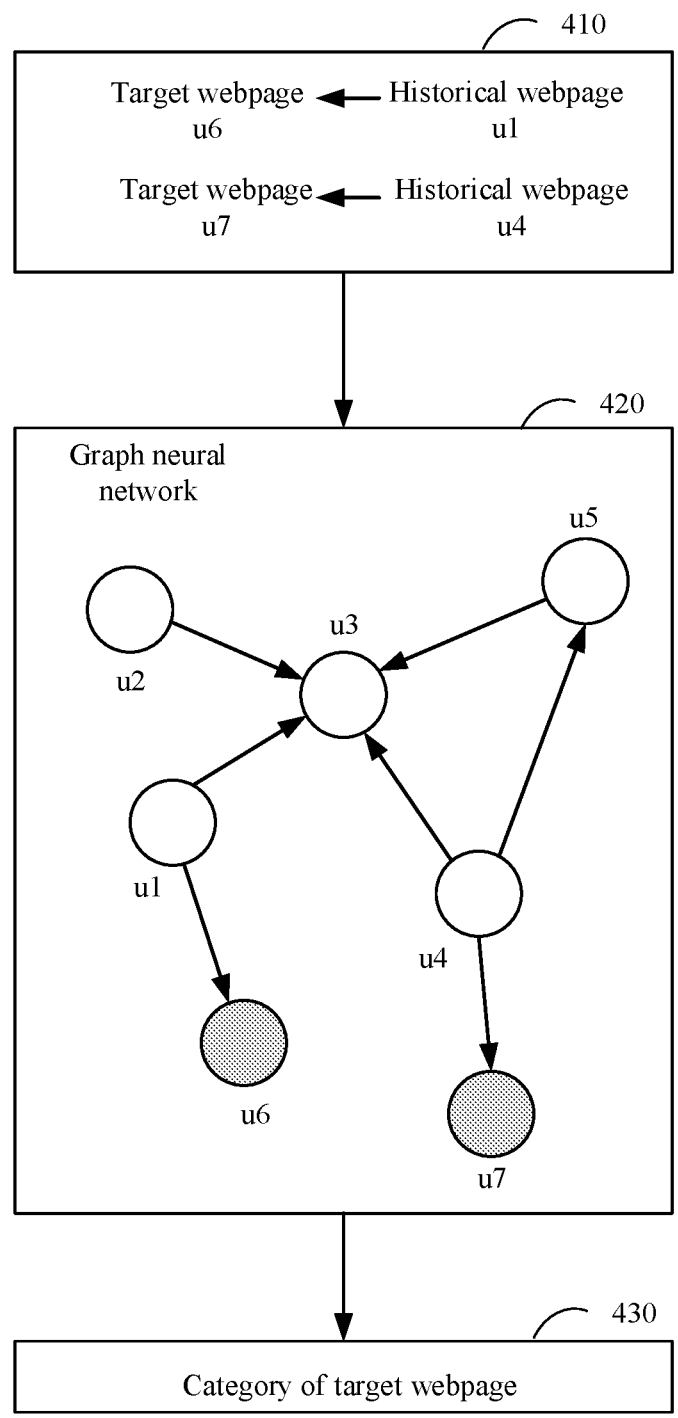
FIG. 4 schematically shows a schematic diagram of identifying a webpage according to an embodiment of the present disclosure.

FIG. 4 schematically shows a schematic diagram of identifying a webpage according to an embodiment of the present disclosure.

As shown in FIG. 4, after the graph neural network is trained based on the historical webpages, relevant data 410 of a target webpage is input into a trained graph neural network 420. The relevant data 410 of the target webpage may include, for example, structural data of each target webpage and a first association relationship between the target webpage and the historical webpage.

For example, the first association relationship represents that a historical webpage jumps to the target webpage within a first predetermined time period, or that the target webpage jumps to the historical webpage within the first predetermined time period.

For example, the target webpage is u6, the historical webpage is u1, u1 may jump to u6 within the first predetermined time period, or u6 may jump to u1 within the first predetermined time period. u1 jumping to u6 may mean, for example, that a page corresponding to the historical webpage u1 contains a link information to the target webpage u6, and the historical webpage u1 may jump to the target webpage u6 via the link information. The first predetermined time period is, for example, a recent period of time.

Alternatively, for the target webpage u6, when a plurality of historical webpages may jump to u6, a predetermined number of historical webpages recently jumping to u6 may be determined as the historical webpages having the first association relationship with u6.

After the relevant data 410 is input into the graph neural network 420, the graph neural network 420 may construct target graph data based on the structural data of the target webpage, the first association relationship and the historical graph data obtained above. For example, the structural data of the target webpage is associated with the historical graph data based on the first association relationship, so as to obtain the target graph data. The constructed target graph data indicates the association relationships between u1, u2, u3, u4, u5, u6 and u7.

The target graph data may have, for example, node elements and edge elements. Each node element corresponds to a historical webpage or a target webpage, and the structural data of the historical webpage or the structural data of the target webpage is associated with the node element. An edge element corresponds to an association relationship between two webpages. For example, taking the historical webpage u1 and the target webpage u6 as examples, each of u1 and u6 corresponds to a node element, and the edge element between the node element for u1 and the node element for u6 represents the first association relationship between u1 and u6.

After the target graph data is obtained, the graph neural network may identify the target graph data to obtain the category of the target webpage. When identifying the target graph data, the graph neural network may fully learn an intrinsic information between the structural data of the webpages based on the association relationship, so as to obtain a similarity between the target webpage and the historical webpage by processing the target graph data. Then, the graph neural network may determine a category 430 of the target webpage based on the similarity and the category of the historical webpage. For example, if a historical webpage similar to the target webpage has a label indicating that the historical webpage is plagiarism, it may be determined that the category 430 of the target webpage is the category of plagiarism with a high probability.

According to embodiments of the present disclosure, after the graph neural network is trained, a target webpage without label is added to the historical graph data to obtain the target graph data, then the similarity between the target webpage and the historical webpage is learned based on the target graph data, and the category of the target webpage is determined based on the similarity and the category of the historical webpage, so that an accuracy of model identification may be improved.

Figure 5:
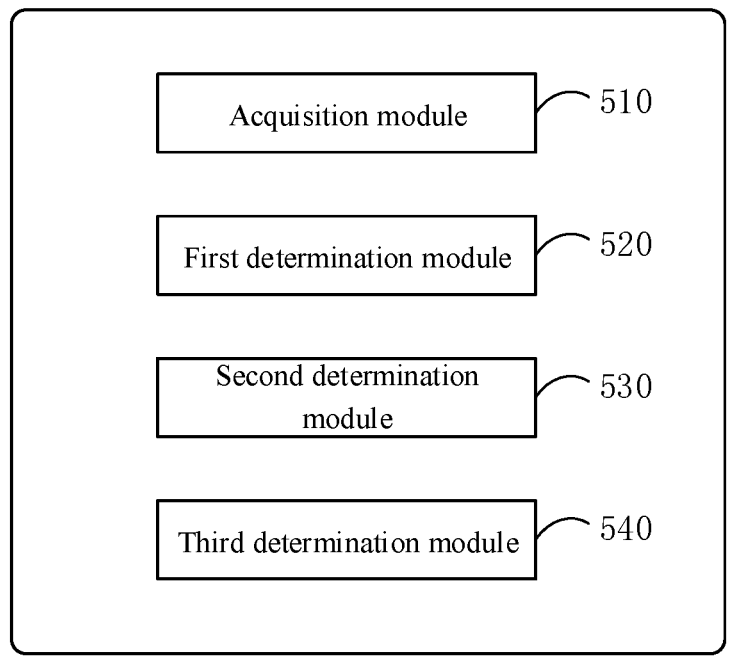
FIG. 5 schematically shows a block diagram of an apparatus of identifying a webpage according to an embodiment of the present disclosure.

FIG. 5 schematically shows a block diagram of an apparatus of identifying a webpage according to an embodiment of the present disclosure.

As shown in FIG. 5, an apparatus 500 of identifying a webpage according to an embodiment of the present disclosure includes, for example, an acquisition module 510, a first determination module 520, a second determination module 530, and a third determination module 540.

The acquisition module 510 may be used to acquire structural data of a target webpage, a first association relationship between the target webpage and a historical webpage, and historical graph data for the historical webpage. According to embodiments of the present disclosure, the acquisition module 510 may perform, for example, operation S210 described above with reference to FIG. 2, and details will not be described here.

The first determination module 520 may be used to determine target graph data for the target webpage and the historical webpage based on the structural data of the target webpage, the first association relationship and the historical graph data. According to embodiments of the present disclosure, the first determination module 520 may perform, for example, operation S220 described above with reference to FIG. 2, and details will not be described here.

The second determination module 530 may be used to determine a similarity between the target webpage and the historical webpage based on the target graph data. According to embodiments of the present disclosure, the second determination module 530 may perform, for example, operation S230 described above with reference to FIG. 2, and details will not be described here.

The third determination module 540 may be used to determine a category of the target webpage based on the similarity and the category of the historical webpage. According to embodiments of the present disclosure, the third determination module 540 may perform, for example, operation S240 described above with reference to FIG. 2, and details will not be described here.

According to embodiments of the present disclosure, the first determination module 520 is further used to: associate the structural data of the target webpage with the historical graph data based on the first association relationship, so as to obtain the target graph data.

According to embodiments of the present disclosure, the first association relationship represents that the historical webpage jumps to the target webpage within a first predetermined time period, or that the target webpage jumps to the historical webpage within the first predetermined time period.

According to embodiments of the present disclosure, the second determination module 530 is further used to: process the target graph data by using a graph neural network, so as to obtain the similarity between the target webpage and the historical webpage; and the third determination module is further used to: determine, by using the graph neural network, the category of the target webpage based on the similarity and the category of the historical webpage.

According to embodiments of the present disclosure, the graph neural network is obtained by: obtaining, by using the graph neural network, the category of the historical webpage based on the historical graph data; and updating a network parameter of the graph neural network based on a reference category and the category of the historical webpage.

According to embodiments of the present disclosure, the historical webpage includes a plurality of historical webpages; the historical graph data is obtained by: acquiring structural data of the plurality of historical webpages and a second association relationship between the plurality of historical webpages; and determining the historical graph data based on the structural data of the historical webpages and the second association relationship.

According to embodiments of the present disclosure, the plurality of historical webpages include a first historical webpage and a second historical webpage; the second association relationship represents that the first historical webpage jumps to the second historical webpage within a second predetermined time period, or that the second historical webpage jumps to the first historical webpage within the second predetermined time period.

In technical solutions of the present disclosure, a collection, a storage, a use, a processing, a transmission, a provision, a disclosure and other processing of user personal information involved comply with provisions of relevant laws and regulations, take necessary security measures, and do not violate public order and good custom.

In the technical solutions of the present disclosure, the acquisition or collection of user personal information has been authorized or allowed by users.

According to embodiments of the present disclosure, the present disclosure further provides an electronic device, a readable storage medium, and a computer program product.

Figure 6:
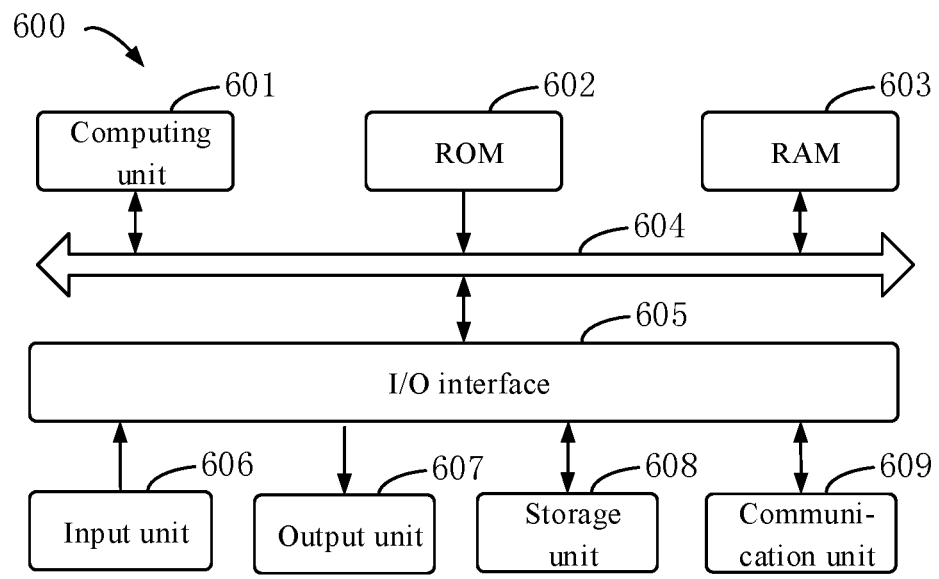
FIG. 6 shows a block diagram of an electronic device for implementing a method of identifying a webpage of embodiments of the present disclosure.

FIG. 6 shows a block diagram of an electronic device for implementing a method of identifying a webpage of embodiments of the present disclosure.

FIG. 6 shows a schematic block diagram of an example electronic device 600 for implementing embodiments of the present disclosure. The electronic device 600 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 includes a computing unit 601 which may perform various appropriate actions and processes according to a computer program stored in a read only memory (ROM) 602 or a computer program loaded from a storage unit 608 into a random access memory (RAM) 603. In the RAM 603, various programs and data necessary for an operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, or a mouse; an output unit 607, such as displays or speakers of various types; a storage unit 608, such as a disk, or an optical disc; and a communication unit 609, such as a network card, a modem, or a wireless communication transceiver. The communication unit 609 allows the electronic device 600 to exchange information/data with other devices through a computer network such as Internet and/or various telecommunication networks.

The computing unit 601 may be various general-purpose and/or dedicated processing assemblies having processing and computing capabilities. Some examples of the computing units 601 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 601 executes various methods and processes described above, such as the method of identifying the webpage. For example, in some embodiments, the method of identifying the webpage may be implemented as a computer software program which is tangibly embodied in a machine-readable medium, such as the storage unit 608. In some embodiments, the computer program may be partially or entirely loaded and/or installed in the electronic device 600 via the ROM 602 and/or the communication unit 609. The computer program, when loaded in the RAM 603 and executed by the computing unit 601, may execute one or more steps in the method of identifying the webpage described above. Alternatively, in other embodiments, the computing unit 601 may be used to perform the method of identifying the webpage by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of identifying a webpage, comprising:
acquiring structural data of a target webpage, a first association relationship between the target webpage and a historical webpage, and historical graph data for the historical webpage, wherein the historical graph data is a knowledge graph, the historical graph data comprises node elements representing historical webpages and edge elements representing relationships between the historical webpages based on a second association relationship, the first association relationship represents that the historical webpage jumps to the target webpage within a first predetermined time period, or that the target webpage jumps to the historical webpage within the first predetermined time period;
determining target graph data for the target webpage and the historical webpage based on the structural data of the target webpage, the first association relationship and the historical graph data;
determining a similarity between the target webpage and the historical webpage based on the target graph data; and
determining a category of the target webpage based on a category of the historical webpage and the similarity, wherein the determining target graph data for the target webpage and the historical webpage based on the structural data of the target webpage, the first association relationship and the historical graph data comprises:

associating the structural data of the target webpage with the historical graph data based on the first association relationship, such that the target graph data includes node elements corresponding to the target and historical webpages, and edge elements corresponding to the first association relationship.

2. The method according to claim 1, wherein:

the determining a similarity between the target webpage and the historical webpage based on the target graph data comprises: processing the target graph data by using a graph neural network, so as to obtain the similarity between the target webpage and the historical webpage; and the determining a category of the target webpage based on a category of the historical webpage and the similarity comprises: determining, by using the graph neural network, the category of the target webpage based on the similarity and the category of the historical webpage.

3. The method according to claim 2, wherein the graph neural network is obtained by:

obtaining, by using the graph neural network, the category of the historical webpage based on the historical graph data; and updating a network parameter of the graph neural network based on a reference category and the category of the historical webpage.

4. The method according to claim 3, wherein a plurality of historical webpages are acquired; and the historical graph data is obtained by:

acquiring structural data of the plurality of historical webpages and the second association relationship between the plurality of historical webpages; and determining the historical graph data based on the structural data of the historical webpages and the second association relationship.

5. The method according to claim 4, wherein the plurality of historical webpages comprise a first historical webpage and a second historical webpage; the second association relationship represents that the first historical webpage jumps to the second historical webpage within a second predetermined time period, or that the second historical webpage jumps to the first historical webpage within the second predetermined time period.

6. An electronic device, comprising:

at least one processor; and a memory communicatively connected to the at least one processor, wherein the memory stores instructions executable by the at least one processor, and the instructions, when executed by the at least one processor, cause the at least one processor to:

acquire structural data of a target webpage, a first association relationship between the target webpage and a historical webpage, and historical graph data for the historical webpage, wherein the historical graph data is a knowledge graph, the historical graph data comprises node elements representing historical webpages and edge elements representing relationships between the historical webpages based on a second association relationship, the first association relationship represents that the historical webpage jumps to the target webpage within a first predetermined time period, or that the target webpage jumps to the historical webpage within the first predetermined time period;

determine target graph data for the target webpage and the historical webpage based on the structural data of the target webpage, the first association relationship and the historical graph data;

determine a similarity between the target webpage and the historical webpage based on the target graph data; and determine a category of the target webpage based on a category of the historical webpage and the similarity, wherein the at least one processor is further configured to:

associate the structural data of the target webpage with the historical graph data based on the first association relationship, such that the target graph data includes node elements corresponding to the target and historical webpages, and edge elements corresponding to the first association relationship.

7. The electronic device according to claim 6, wherein:

wherein the at least one processor is further configured to: process the target graph data by using a graph neural network, so as to obtain the similarity between the target webpage and the historical webpage; and wherein the at least one processor is further configured to: determine, by using the graph neural network, the category of the target webpage based on the similarity and the category of the historical webpage.

8. The electronic device according to claim 7, wherein the at least one processor is further configured to obtain the graph neural network by:

obtaining, by using the graph neural network, the category of the historical webpage based on the historical graph data; and updating a network parameter of the graph neural network based on a reference category and the category of the historical webpage.

9. The electronic device according to claim 8, wherein a plurality of historical webpages are acquired; and the at least one processor is further configured to obtain the historical graph data by:

acquiring structural data of the plurality of historical webpages and the second association relationship between the plurality of historical webpages; and determining the historical graph data based on the structural data of the historical webpages and the second association relationship.

10. The electronic device according to claim 9, wherein the plurality of historical webpages comprise a first historical webpage and a second historical webpage; the second association relationship represents that the first historical webpage jumps to the second historical webpage within a second predetermined time period, or that the second historical webpage jumps to the first historical webpage within the second predetermined time period.

11. A non-transitory computer-readable storage medium having computer instructions therein, wherein the computer instructions are configured to cause a computer to:

acquire structural data of a target webpage, a first association relationship between the target webpage and a historical webpage, and historical graph data for the historical webpage, wherein the historical graph data is a knowledge graph, the historical graph data comprises node elements representing historical webpages and edge elements representing relationships between the historical webpages based on a second association relationship, the first association relationship represents that the historical webpage jumps to the target webpage within a first predetermined time period, or that the target webpage jumps to the historical webpage within the first predetermined time period;

determine target graph data for the target webpage and the historical webpage based on the structural data of the target webpage, the first association relationship and the historical graph data;

determine a similarity between the target webpage and the historical webpage based on the target graph data; and determine a category of the target webpage based on a category of the historical webpage and the similarity, wherein the computer instructions are further configured to cause the computer to:

associate the structural data of the target webpage with the historical graph data based on the first association relationship, such that the target graph data includes node elements corresponding to the target and historical webpages, and edge elements corresponding to the first association relationship.

12. The non-transitory computer-readable storage medium according to claim 11, wherein:

wherein the computer instructions are further configured to cause the computer to: process the target graph data by using a graph neural network, so as to obtain the similarity between the target webpage and the historical webpage; and wherein the computer instructions are further configured to cause the computer to: determine, by using the graph neural network, the category of the target webpage based on the similarity and the category of the historical webpage.

13. The non-transitory computer-readable storage medium according to claim 12, wherein the computer instructions are further configured to cause the computer to obtain the graph neural network by:

obtaining, by using the graph neural network, the category of the historical webpage based on the historical graph data; and updating a network parameter of the graph neural network based on a reference category and the category of the historical webpage.

14. The non-transitory computer-readable storage medium according to claim 13, wherein a plurality of historical webpages are acquired; and the computer instructions are further configured to cause the computer to obtain the historical graph data by:

acquiring structural data of the plurality of historical webpages and the second association relationship between the plurality of historical webpages; and determining the historical graph data based on the structural data of the historical webpages and the second association relationship.

* * * * *